Oct. 30, 1928.
O. C. TRAVER
PROTECTIVE DEVICE
Filed July 14, 1924
1,689,508
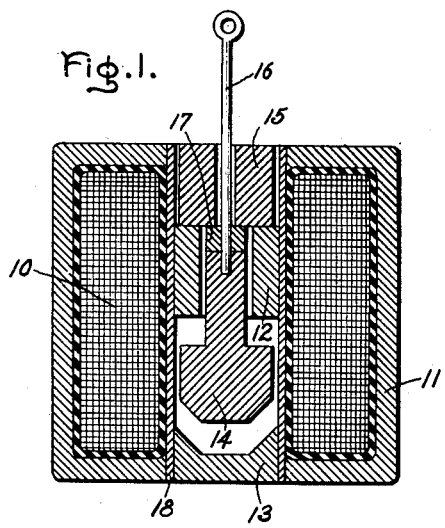
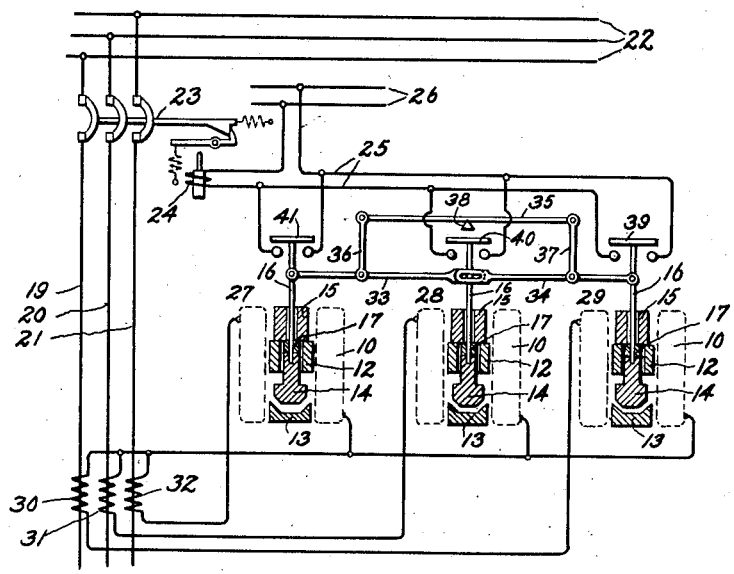
Inventor:
Oliver C. Traver,
by
His Attorney.

Patented Oct. 30, 1928.

1,689,508

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PROTECTIVE DEVICE.

Application filed July 14, 1924. Serial No. 725,870.

My invention relates to improvements in protective devices which function in conformance with the relative values of a plurality of electric currents or potentials and more particularly to electroresponsive devices or relays which function in conformance with the phase balance of a polyphase alternating electric current circuit, and an object of my invention is to provide a relay having improved characteristics in both construction and operation.

In the protection of electric systems against unbalanced conditions, it is often desirable to maintain continuity of service until a predetermined unbalance occurs, for example, in the currents or potentials of a plurality of electric circuits. Thus, in polyphase alternating electric current circuits, the currents in the different phases may become unequal due to an open phase or unequal loading of the phases and with a predetermined phase unbalance, it is desirable to interrupt the circuits. However, a device which is to respond to such a condition should not operate on over-current conditions which affect all phases substantially equally, as in starting polyphase machines, such as motors, unwarranted interruptions of service may occur. Furthermore, in the comparison of the electrical effects, it is desirable for nicety of operation that the parts of the protective device or relay involve as simple a construction as possible in order to reduce frictional losses to a minimum and to avoid the possibility of erroneous operation.

It is, therefore, an object of my invention to provide an improved electroresponsive device which functions only in accordance with the relative values of a plurality of electric currents, such as a predetermined unbalance in two or more currents. Another object of my invention is to provide an improved and simple relay construction such that the friction of the movable parts is not effective so as to disturb the nicety of balancing as to tend to incorrect operation. A further object of my invention is to provide an improved phase balance relay for polyphase alternating electric current systems, such that overcurrent conditions similarly affecting all the phases will not cause operation of the relay.

My invention will be better understood from the following description taken in connection with the accompanying drawing and its scope will be pointed out in the appended claims.

In the accompanying drawing, Fig. 1 illustrates in a sectional view a portion of an electroresponsive device embodying my invention and Fig. 2 illustrates partly in section and in diagram an electroresponsive device embodying my invention and applied to a polyphase alternating electric current system for protection against conditions of phase unbalance.

The electroresponsive device or electromagnetic element shown in Fig. 1 comprises an energizing winding 10 and a magnetic circuit comprising a magnetic structure 11, two spaced stationary magnetic members 12 and 13, an armature 14 movable between said members and a movable magnetic member 15. This member 15 is adapted to be held magnetically against the stationary magnetic member 12 with current in the winding 10 such that the attractive effect between the movable member 15 and the stationary member 12, that is the restraining force of the member 15, and the attractive effect between the armature 14 and the stationary member 13, that is, the operating force of the armature 14, exceed an external force applied to the armature 14 through, for example, a rod 16 and tending to move the armature toward the member 12, that is up. The armature 14 normally tends to move from the member 12, that is down, under the magnetizing effect of the winding 10, but may be restrained by a force such as an upward pull on the rod 16. Thus, upon a decrease in or failure of such pull, the armature 14 will move down or upon increase in pull sufficient to overcome the operating force of the armature 14 and the restraining force of the movable member 15, the armature 14 will move up.

In order to minimize the attractive effect between the armature 14 and the stationary magnetic member 12, this member may be made hollow and the armature provided with a portion projecting thereinto. In this way, practically all of the flux induced passes from the magnetic structure 11, through the stationary magnetic member 13, across the gap between this member and the armature 14, through the armature to the stationary magnetic member 12 and the movable magnetic member 15, and back to the magnetic structure 11. In order that there may not be a direct path for the flux from the armature 14 to the movable magnetic member 15, a non-magnetic member 17 is interposed between them. This member may be of brass. A non-magnetic liner such as a brass tube 18 extending through the winding 10 may be provided as is usual in the construction of electromagnets.

Referring now to Fig. 2, a polyphase alternating electric current line comprising conductors 19, 20, 21 is arranged to be connected to a source or bus 22 by a suitable circuit interrupting means, such as a circuit breaker 23 which is shown as of the latched closed type, and is arranged to be controlled for opening by a trip-coil 24 connected in a control circuit 25 and arranged to be energized from a suitable source or control bus 26.

For controlling the control circuit and thereby the circuit breaker 23 in response to a condition of phase unbalance on the circuits 19, 20, 21, I provide an electroresponsive device or relay comprising a plurality of electromagnetic elements 27, 28, 29, each similar to the element shown in Fig. 1. The energizing windings 10 of these elements are connected in series relation with the circuit conductors 19, 20, and 21 respectively through current transformers 30, 31, 32. The elements 27, 28, 29 are, therefore, energized in accordance with the currents in the respective phases or circuits of the line to be protected. Consequently, the operating force of the armature 14 and the restraining force of the stationary magnetic member 12 are dependent upon the current in the phase of the circuit to which the winding 10 of the element is connected.

For comparing these operating and restraining forces, I provide a balancing mechanism interconnecting the armatures 14, that is the rods 16 of the elements 27, 28 and 29. This mechanism may be of the lever type comprising levers 33 and 34 pivotally connected between rod 16 of element 28 and rods 16 of elements 27 and 29, respectively. To allow for the angular movement of these levers, they may be provided with lost motion slots where they are pivoted to the rod 16 of element 28. A balancing lever 35 is pivotally connected to the levers 33 and 34 through links 36 and 37 and is mounted for movement on a stationary fulcrum or pivot 38. Associated with this balancing mechanism and arranged to be actuated thereby are contact controlling members 39, 40, and 41 which are arranged to cooperate with stationary contacts in the control circuit 25.

With this arrangement, it is obvious that so long as the winding 10 of each of the elements 27, 28 and 29 is energized, the armature 14 of each element tends to move toward its cooperating pole piece 13 and the movable magnetic member 15 is held magnetically by its cooperating stationary magnetic member 12, but with a tendency to be moved therefrom by virtue of the upward pull exerted on the rod 16 by the armatures of the other elements and transmitted through the balancing mechanism. If, now, the fulcrum 38 is at the mid-point of lever 35 and the links 36 and 37 are connected to the levers 33 and 34, assumed to be equal in length as shown, respectively at substantially two-thirds of the distance from rod 16 of element 28 to rods 16 of the elements 27 and 29, then with substantially the same current in the winding 10 of each of the elements 27, 28, 29, the attractive effects between the armatures 14 and their cooperating pole pieces 13 will be balanced. Therefore, no movement of the parts will occur. This will be the normal condition, that is, phase balance or current in each of the phases the same. Consequently, whether the phase currents are above or below normal is immaterial as long as they remain substantially equal. Inasmuch as the movement of the magnetic member 15 in one direction is limited by the stationary magnetic member 12, the restraining force of the member 15 is not normally added to the operating force of the corresponding armature 14. But with the armatures 14 so nicely balanced, a small phase unbalance not sufficient to warrant the opening of the circuit breaker 23 would tend to move one of the contacts 39, 40, 41 to circuit controlling position if it were not for the restraint imposed on the armatures 14 by the movable magnetic members 15. Consequently, a predetermined phase unbalance must exist before the restraint of one of the movable magnetic members 15 can be overcome so as to permit the upward movement of the corresponding armature 14 by the armature or armatures of the other element or elements.

Assuming, for example, a condition of phase unbalance such that the conductors 19 and 21 carry currents sufficiently in excess of the current in conductor 20 to warrant opening the circuit breaker 23, that is, a predetermined phase unbalance, then the combined attractive effects between the armatures 14 and the cooperating pole pieces 13 of elements 27 and 29 will overcome the restraint of the movable magnetic member 15 of element 28 as well as the operating force of the armature 14 of this element. Consequently, one or both of the contact controlling members 39 and 41 will be moved to contact controlling position to complete the control circuit 25 of the trip coil 24 and thereby effect the opening of the circuit breaker 23. Obviously, as the pull of the magnetic member 15 of element 28 is overcome by the operating forces of the armatures 14 of elements 27 and 29, the restraint of the member 15 is materially reduced since the reluctance of its magnetic circuit is increased. Consequently the contact controlling members are quickly moved to circuit controlling position.

Assuming, now, a condition of phase unbalance such that the current in conductor 20 exceeds the currents in conductors 19 and 21 so that the operating force of the armature 14 of element 28 exceeds the operating forces of the armatures 14 of elements 27 and 29 and the restraining forces of the movable magnetic members 15 of these elements, then the armature 14 of element 28 will move down and close the control circuit 25 through contact controlling member 40. Similarly, for other conditions of phase unbalance, it will be clear that at least one of the armatures 14 will move one of the circuit controlling members 39, 40 and 41 to close the control circuit 25 and thereby effect the opening of the circuit breaker 23.

Although I have shown and described in detail an embodiment of my invention and described its application to a system in which it has a particular relation of utility, it will be obvious to those skilled in the art that changes and variations both in the structure disclosed and in the system to which the protection is applied may be made without departing from my invention and I, therefore, aim in the appended claims to cover all modifications or applications that fall within the spirit of my invention.

What I claim as new and desire to secure by Letters Patent of the United States, is:—

1. A protective system for electric circuits wherein means are provided for interrupting the circuits upon the occurrence of an abnormal circuit condition, comprising in combination with said circuit interrupting means, a relay including a plurality of armatures, a plurality of windings connected respectively to said circuits for respectively controlling said armatures, said armatures being mechanically interconnected and arranged to balance the forces exerted by said windings on the respective armatures when said windings are equally energized, and means for restraining each armature against the operating force exerted by the other armature or armatures, said restraining means being arranged to exert an effect proportional to the energization of the corresponding winding.

2. A protective system for a polyphase alternating electric current circuit wherein means are provided for interrupting the circuit upon the occurrence of an abnormal circuit condition, comprising in combination with said circuit interrupting means, a relay including a plurality of armatures, a plurality of windings connected respectively in series relation with the conductors of said circuit for respectively controlling said armatures, said armatures being mechanically interconnected and arranged to balance the forces exerted by said windings on the respective armatures when the currents in said conductors are equal, and means for restraining each armature against the operating force exerted by the other armatures, said restraining means being arranged to exert an effect proportional to the current in the corresponding winding.

3. A protective system for a polyphase alternating electric current circuit wherein means are provided for interrupting the circuit upon the occurrence of an abnormal circuit condition, comprising in combination with said circuit interrupting means, a relay including a plurality of armatures, a plurality of windings connected respectively in series relation with the conductors of said circuit for respectively controlling said armatures, said armatures being mechanically interconnected and arranged to balance the forces exerted by said windings on the respective armatures when the currents in said conductors are equal and means for restraining each of said armatures against the operating force exerted by the other armatures in accordance with the currents in the respective windings comprising a plurality of movable magnetic members arranged to have a limited movement in one direction whereby the restraint of said members is added to the operating force of the corresponding armatures only upon movement thereof in the opposite direction.

4. A protective system for a polyphase alternating electric current circuit wherein means are provided for interrupting the circuit upon the occurrence of an abnormal circuit condition, comprising in combination with said circuit interrupting means, a relay including a plurality of armatures, a plurality of windings connected respectively in series relation with the conductors of said circuit for respectively controlling said armatures, said armatures being mechanically interconnected and arranged to balance the forces exerted by said windings on the respective armatures when the currents in said windings are equal, and a plurality of movable magnetic members one for each of said armatures for restraining each of the armatures against the operating force exerted by the other armatures, each of said members being arranged to exert an effect proportional to the current in the corresponding winding.

5. A relay including a plurality of armatures, a plurality of windings for respectively controlling said armatures, said armatures being mechanically interconnected and arranged to balance the forces exerted by said windings on the respective armatures when the windings exert substantially equal forces and movable magnetic means for restraining each armature against the operating force exerted by the other armatures arranged to exert an effect proportional to the energization of the corresponding winding.

6. A relay including a plurality of armatures, a plurality of windings for respectively controlling said armatures, said armatures being mechanically interconnected and arranged to balance the forces exerted by said windings on the respective armatures when the windings exert substantially equal forces, movable magnetic means for restraining each armature against the operating force exerted by the other armatures arranged to exert an effect proportional to the energization of the corresponding winding, and means for increasing the reluctance of the magnetic circuit of said movable magnetic means upon movement thereof whereby the restraint exerted thereby is reduced when overcome by the operating force of the other armatures.

7. In a protective system for a polyphase alternating electric current circuit wherein means adapted to be operated to interrupt the circuit are provided, means operative in response to a condition of phase unbalance on said circuit for controlling said circuit interrupting means including a plurality of electromagnetic elements each having an energizing winding, said windings being connected to be energized respectively in accordance with the currents in the different phases of said circuit, an armature normally tending to move in one direction in response to the energization of said winding, a movable magnetic member normally adapted to restrain said armature against movement in the opposite direction, and a balancing mechanism interconnecting said armatures whereby under a condition of phase balance the tendency for movement in said one direction of said armatures is balanced and whereby upon a predetermined condition of phase unbalance the restraint of the movable magnetic member of one of the elements is overcome by the tendency of the armature of another element to move in said one direction.

8. In a protective system for a polyphase alternating electric current circuit wherein means adapted to be operated to interrupt the circuit are provided, means operative in response to a condition of phase unbalance on said circuit for controlling said circuit interrupting means including a plurality of electromagnetic elements each having an energizing winding, said windings being connected to be energized in accordance with the currents in the respective phases of said circuit and a magnetic circuit comprising two stationary magnetic members, an armature movable between said members and normally tending to move in one direction and a movable magnetic member arranged for abutting engagement with one of said stationary members and normally adapted to restrain said armature against movement in the opposite direction, and a balancing mechanism interconnecting the armatures of said elements whereby under a condition of phase balance the tendency for movement in said one direction of said armatures is balanced and whereby upon a predetermined condition of phase unbalance the restraint of the movable magnetic member of one of the elements is overcome by the tendency of the armature of another element to move in said one direction.

9. An electroresponsive device comprising a plurality of electromagnetic elements each comprising an energizing winding and a magnetic circuit having two spaced stationary magnetic members, one of said members being hollow, an armature mounted for movement between said members, said armature having a portion projecting into said hollow magnetic member whereby to minimize the attractive effect between the armature and the hollow magnetic member, and means for restraining said armature against movement toward said hollow magnetic member arranged to permit movement of the armature from said hollow magnetic member comprising a movable magnetic member arranged for abutting engagement with said hollow magnetic member and said armature, and a balancing mechanism interconnecting the armatures of said elements.

10. An electroresponsive device comprising an energizing winding and a magnetic circuit comprising two stationary magnetic members, one of said members being hollow, an armature mounted for movement between said members and having a portion projecting into the hollow member whereby to minimize the attractive effect between the armature and said hollow magnetic member, and means for restraining said armature against movement in one direction arranged to permit movement of the armature in the opposite direction, comprising a movable magnetic member arranged for abutting engagement with said hollow magnetic member and adapted upon current above a predetermined value in said winding to restrain said armature against movement in one direction but to permit movement of the armature in the opposite direction and upon current below said predetermined value to permit movement of said armature in said one direction.

11. An electroresponsive device comprising a plurality of electromagnetic elements, each comprising an energizing winding and a magnetic circuit having two stationary magnetic members, an armature mounted for movement between said members and tending to move in one direction upon energization of said winding, and means for restraining said armature against movement in the opposite direction comprising a movable magnetic member arranged for abutting engagement with one of said stationary magnetic members, and a mechanism interconnecting the armatures of said plurality of electromagnetic elements, the construction and arrangement of parts being such that with current above a predetermined value in the winding of each of said elements, the armatures are restrained by the respective movable magnetic members against movement in said opposite direction and such that upon a relative change in the currents in the windings of the elements the movable magnetic member of one element permits movement of its associated armature in said opposite direction in response to the tendency of the armature of another element to move in said one direction.

12. An electroresponsive device comprising an energizing winding two spaced stationary magnetic members, an armature movable between said members, and a movable magnetic member contiguous to one of said stationary magnetic members arranged to exert on said armature a restraining effect proportional to the current in said winding.

13. An electroresponsive device comprising an energizing winding and a magnetic circuit comprising two spaced stationary magnetic members, a movable magnetic member arranged for abutting engagement with one of said stationary magnetic members, and an armature movable between said stationary members arranged with current above a predetermined value in said winding to be restrained against movement in one direction by said movable magnetic member.

14. An electroresponsive device comprising an energizing winding and a magnetic circuit comprising two stationary magnetic members, an armature movable between said members, and a movable magnetic member arranged for abutting engagement with one of said stationary magnetic members and adapted with current above a predetermined value in said winding to restrain said armature against movement in one direction and with current below said predetermined value to permit movement of the armature in said direction.

In witness whereof, I have hereunto set my hand this 11th day of July, 1924.

OLIVER C. TRAVER.